(12) United States Patent
Domokos et al.

(10) Patent No.: US 8,088,706 B2
(45) Date of Patent: Jan. 3, 2012

(54) CATALYST COMPOSITION PREPARATION AND USE

(75) Inventors: Laszlo Domokos, Amsterdam (NL); Hermanus Jongkind, Amsterdam (NL); Johannes Anthonius Robert Van Veen, Amsterdam (NL)

(73) Assignee: Shell Oil Company, Houston, TX (US)

( * ) Notice: Subject to any disclaimer, the term of this patent is extended or adjusted under 35 U.S.C. 154(b) by 102 days.

(21) Appl. No.: 12/432,278

(22) Filed: Apr. 29, 2009

(65) Prior Publication Data
US 2009/0209414 A1    Aug. 20, 2009

Related U.S. Application Data

(62) Division of application No. 10/783,508, filed on Feb. 20, 2004, now Pat. No. 7,544,285.

(30) Foreign Application Priority Data

Feb. 24, 2003  (EP) .................................... 03251094

(51) Int. Cl.
| | |
|---|---|
| *B01J 23/00* | (2006.01) |
| *B01J 21/00* | (2006.01) |
| *B01J 20/00* | (2006.01) |
| *B01J 29/00* | (2006.01) |
| *B01J 37/00* | (2006.01) |

(52) U.S. Cl. ........ 502/257; 502/236; 502/238; 502/242; 502/254; 502/255; 502/256; 502/258; 502/259; 502/260; 502/263; 502/305; 502/306; 502/307; 502/308; 502/309; 502/314; 502/315; 502/316; 502/322; 502/323; 502/327; 502/328; 502/329; 502/332; 502/335; 502/336; 502/337; 502/338; 502/342; 502/343; 502/349; 502/350; 502/351; 502/407; 502/415; 502/439

(58) Field of Classification Search .................. 502/236, 502/238, 242, 253, 263, 322, 323, 332, 335, 502/337, 342, 343, 407, 415, 439, 254–260, 502/305–309, 314–316, 327–329, 349–351
See application file for complete search history.

(56) References Cited

U.S. PATENT DOCUMENTS 3,016,647 A    1/1962   Peterson et al. .................... 43/3
(Continued)

FOREIGN PATENT DOCUMENTS

EP          1090682 A1    4/2001
(Continued)

OTHER PUBLICATIONS

"Hydrodesulfurization of Methyl-Substituted Dibenzothiophenes: Fundamental Study of Routes to Deep Desulfurization," by M. V. Landau, D. Berger, and M. Herskowitz, Journal of Catalysis 159, (1996) pp. 236-245.

*Primary Examiner* — Cam N. Nguyen
(74) *Attorney, Agent, or Firm* — Charles W. Stewart

(57) ABSTRACT

A bulk metal oxide catalyst composition of the general formula $$(X)b(M)c(Z)d(O)e \qquad (I)$$

wherein
  X represents at least one non-noble Group VIII metal;
  M represents at least one non-noble Group VIb metal;
  Z represents one or more elements selected from aluminum, silicon, magnesium, titanium, zirconium, boron, and zinc; one of b and c is the integer 1; and
  d and e and the other of b and c each are a number greater than 0 such that the molar ratio of b:c is in the range of from 0.5:1 to 5:1, the molar ratio of d:c is in the range of from 0.2:1 to 50:1, and the molar ratio of e:c is in the range of from 3.7:1 to 108:1; is prepared by controlled (co)precipitation of component metal compounds, refractory oxide material, and alkali compound in protic liquid. Resulting compositions find use in hydrotreatment processes involving particularly hydrodesulphurization and hydrodenitrification.

8 Claims, 2 Drawing Sheets

X-ray diffraction patterns of the catalyst compositions Example 1 (A), Example 3 (B) and Example 4 (C).

U.S. PATENT DOCUMENTS

| | | | |
|---|---|---|---|
| 3,825,502 A | 7/1974 | Takenaka et al. | 502/241 |
| 4,404,097 A | 9/1983 | Angevine et al. | 208/210 |
| 4,408,067 A | 10/1983 | Nakamura et al. | 560/215 |
| 4,418,007 A | 11/1983 | Derrien | 502/312 |
| 4,425,260 A | 1/1984 | Ebner | 502/255 |
| 4,491,639 A | 1/1985 | Happel et al. | 502/219 |
| 5,244,858 A | 9/1993 | Usui et al. | 502/220 |
| 6,037,300 A | 3/2000 | Kasztelan et al. | 502/204 |
| 6,090,745 A | 7/2000 | DuBois et al. | 502/313 |
| 6,124,232 A | 9/2000 | Chang et al. | 502/308 |
| 6,162,350 A | 12/2000 | Soled et al. | 208/113 |
| 6,271,169 B1 | 8/2001 | Kourtakis et al. | 502/305 |
| 6,638,890 B2 | 10/2003 | Tanimoto et al. | 502/300 |
| 6,780,816 B2 | 8/2004 | Tanimoto et al. | 502/300 |
| 7,071,140 B2 | 7/2006 | Paparizos et al. | 502/215 |
| 2003/0065216 A1 | 4/2003 | Tanimoto et al. | 562/532 |
| 2004/0102643 A1 | 5/2004 | Tway | 558/325 |

FOREIGN PATENT DOCUMENTS

| | | |
|---|---|---|
| EP | 1090683 A1 | 4/2001 |
| WO | WO 00/41810 | 7/2000 |
| WO | WO 00/42119 | 7/2000 |
| WO | WO2004073659 | 9/2004 |

Figure 1: X-ray diffraction patterns of the catalyst compositions Example 1 (A), Example 3 (B) and Example 4 (C).
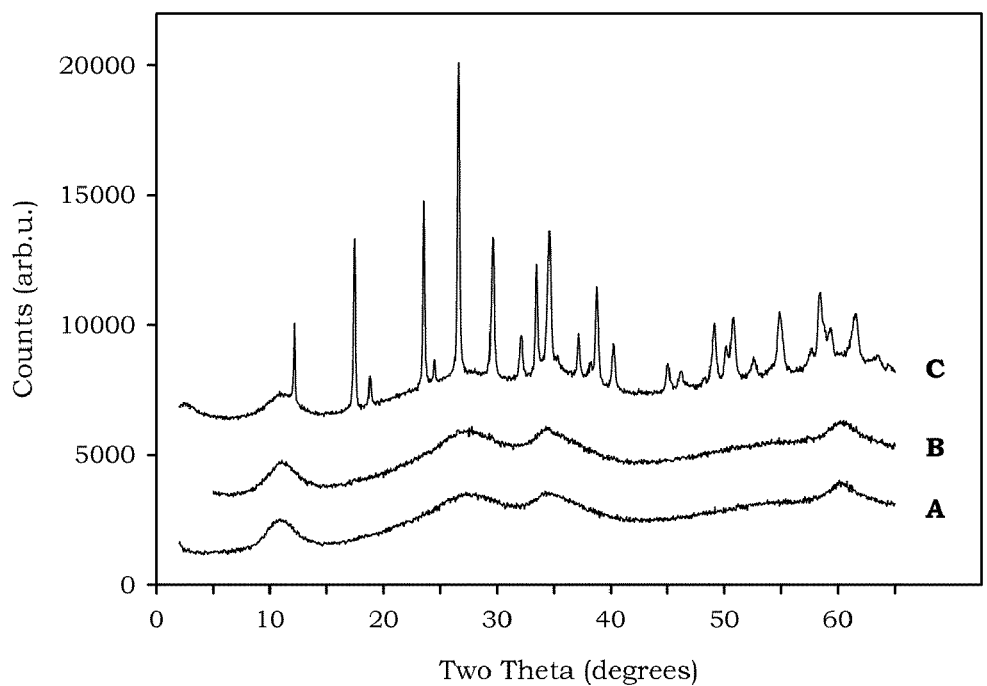

Figure 2: X-ray diffraction patterns of the catalyst compositions of Example 10 (D) and Example 23 (E)
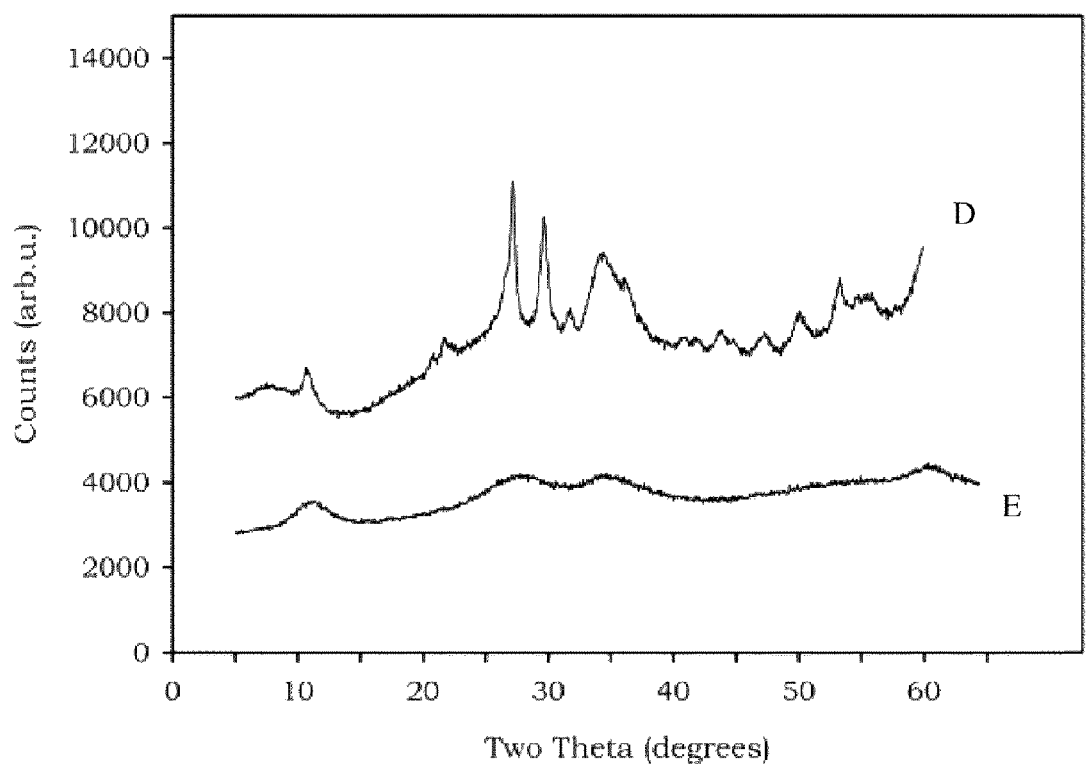

CATALYST COMPOSITION PREPARATION AND USE

This application is a division of application Ser. No. 10/783,508, filed Feb. 20, 2004, now U.S. Pat. No. 7,544,285.

FIELD OF THE INVENTION

The present invention concerns catalyst compositions having a high metals content, their preparation and use in hydroprocessing, particularly hydrodesulphurisation and hydrodenitrogenation.

BACKGROUND OF THE INVENTION

Hydroprocessing reactions involve the application of hydrogen to a substrate, usually under elevated temperature and pressure, in the presence of a catalyst with the aim of causing a physical or chemical change in the substrate. Most such hydroprocessing reactions occur in refinery operations where the substrate is a hydrocarbon feedstock.

Conventional hydroprocessing catalysts are generally in the form of a carrier of a refractory oxide material on which hydrogenation metals are deposited, the choice and amount of each component being determined by the end use. Refractory oxide materials usual in the art are amorphous or crystalline forms of alumina, silica and combinations thereof (though for some applications, materials such as titania may be used). These oxide materials can have some intrinsic catalytic activity but often only provide the support on which active metals compounds are held. The metals are generally base or noble metals from Group VIII and Group VIB of the Periodic Table which are deposited in oxidic form during manufacture; in the case of base metals, the oxides are then sulphided prior to use to enhance their activity.

Also proposed in the art for hydrotreating and particularly for use in hydrodesulfurization (HDS), especially deep desulfurisation of diesel fractions, are catalyst compositions which contain refractory oxide material but which are made via co-precipitation. European Patent specification EP-A-1090682 describes one such co-precipitation proposal to prepare a hydrotreating catalyst, which catalyst has various properties including a crystalline phase, such as alpha-alumina, viewed as necessary for high activity and to impart mechanical strength and therefore a longer service life in commercial use.

By co-precipitation, the incorporation of a dispersed metals content into a conventional carrier material is attempted by enabling intimate contact between metals compounds and carrier material and thus enabling the metals to become dispersed through the carrier material before shaping. This contrasts with conventional impregnation techniques where only a small amount of metals deposition is possible since the shaped carrier is already formed and there are diffusional and space limitations for the metal ions or compounds to become dispersed through the catalyst support.

Alternative catalyst forms have been proposed for use in the hydroprocessing of, for example, refinery streams. One such group of catalysts are termed 'bulk catalysts'. Such catalysts are formed from metal compounds only, usually by co-precipitation techniques, and have no need for a catalyst carrier or support; see for example WO 00/42119 and U.S. Pat. No. 6,162,350. Both publications disclose bulk Group VIII and Group VIb metal catalysts. U.S. Pat. No. 6,162,350 discloses that such catalysts may contain one or more of each metal type, and examples show NiMo, NiW and the most preferred NiMoW bulk catalysts. Two preparation routes are disclosed: one utilising fully dissolved metals and the other utilising contacting and reacting the metals in the presence of a protic liquid, such as water, with the requirement that at least one metal is at least partly in the solid state during the addition, mixing and reaction steps. The materials are said to be essentially amorphous with a unique X-ray diffraction pattern showing crystalline peaks at d=2.53 Å and d=1.70 Å.

The preference in U.S. Pat. No. 6,162,350 (and WO 00/42119) is that no binder is incorporated into the final catalyst composition since the activity of the bulk catalyst composition may be reduced (Column 14, lines 10 to 114). If, however, a binder is to be used the resulting catalyst composition comprises the bulk catalyst particles embedded in the binder with the morphology of the bulk catalyst particles essentially maintained in the resulting catalyst composition (Col. 14, lines 24 to 30). The binder when present is preferably added prior to shaping but can be added at any stage in the catalyst preparation. Examples 12 to 14 show addition of binder prior to shaping; Example 15 shows addition of alumina to form a NiMoW-alumina composition having approximately 8 wt % alumina, the alumina being 'present during the preparation of the bulk catalyst composition' but without any detail on how this is done whilst preserving the independent morphology of the bulk catalyst particles. No activity data is provided for the binder-containing catalysts of any of these examples.

The preparation of the trimetallic bulk catalyst particles via the route utilising protic liquid and at least one metal at least partly in solid state form, is also described in WO 00/41810. Here the prepared materials are described as having an XRD diffraction pattern in which the characteristic full width at half maximum value of the peak at 2θ=53.6° (±0.7°) does not exceed 2.5° when the Group VIb metals are molybdenum, tungsten, and, optionally, chromium, or does not exceed 4° when the Group VIb metals are tungsten and chromium, or that of the peak at 2θ=63.5° (±0.6°) does not exceed 4° when the Group VIb metals are molybdenum and chromium, all metals being in their oxidic state. Again binder is not preferred but may be present to provide mechanical strength in the final catalyst composition wherein the bulk catalyst particles essentially still maintain an independent morphology.

In Journal of Catalysis 159, 236-245 (1996), Landau et al compare the HDS activity of conventional NiMo and CoMo catalysts against a precipitated bulk NiMo catalyst and a co-precipitated NiMo-silica catalyst (containing 10.1 wt % $SiO_2$ on an oxide basis) on the sulfur-containing substrates of dibenzothiophene (DBT) and 4,6-dimethyldibenzothiophene (DMDBT). The co-precipitated catalyst here is made by adding silica powder to a water solution of (fully dissolved) nickel nitrate and ammonium paramolybdate and then introducing ammonium hydroxide as a precipitation agent; the product catalysts were recovered by drying, ie evaporation. The results are variable; for DBT neither the bulk catalyst nor the silica-containing variant demonstrates HDS activity to rival the conventional CoMo catalyst; for DMDBT their HDS activity is better. The article points to optimisation of catalytic sites/structures such as $Mo(W)S_2$ crystals, bulk NiMo particles and the Ni—Mo—Al monolayer, and $MoS_2$ crystal edge planes, in order to obtain effective deep desulfurisation catalysts for petroleum gas oils.

In refinery processes, feedstocks contain a variety of contaminants, the main ones being sulfur and nitrogen. While sulfur reduction has always been desirable, increasingly strict regulations on gas emissions eg from motor vehicles, is driving the need for catalysts which can provide ultra low sulfur fuels. For effective HDS activity, and especially for deep desulfurisation required for environmental reasons, a catalyst must be effective to remove all sulfur compounds, whether simple or complex. Nitrogen contaminants, while often low in amount, can have a severe poisoning effect on catalysts and also adversely affect end product storage stability and quality. The poisoning effect on catalysts is such that a catalyst effective for, eg HDS, of a pure chemical feedstock may be ineffective or short-lived when exposed to an impure refinery feedstock.

Thus, there is particularly a demand for hydroprocessing catalysts for feedstocks having both sulfur and nitrogen contaminants, which catalysts have a significant hydrodesulphurisation activity for both simple and complex sulfur-containing compounds in the presence of nitrogen contaminants but even more desirably also have a high or improved hydrodenitrogenation (HDN) activity.

SUMMARY OF THE INVENTION

We have now unexpectedly found that the co-precipitated catalytic material of the 'bulk catalyst' type described by Landau et al, when prepared by a new preparation technique, and new oxidic catalyst compositions not previously described, have a significant activity for HDS both for simple substrates, such as thiophene, and for complex sulphur substrates in hydrocarbon feedstocks, and furthermore in the latter case are not affected by nitrogen contaminants but have an exceptionally high HDN activity when used to treat a hydrocarbon feedstock having both sulfur and nitrogen contaminants present. The HDS and the HDN activities found are significantly greater than that found for conventional, commercial hydrotreating catalysts, and that found for 'bulk catalysts' where the bulk catalyst particles are prepared by techniques already described in the art. Preferred forms of these catalyst compositions are found to have their own unique structure which is different to that described for bulk catalyst particles of the prior art.

Accordingly the present invention provides a process for the preparation of a catalyst composition of the general formula, on an oxide basis,

(I)

wherein
X represents at least one non-noble Group VIII metal;
M represents at least one non-noble Group VIb metal;
Z represents one or more elements selected from aluminium, silicon, magnesium, titanium, zirconium, boron and zinc;
O represents oxygen;
one of b and c is the integer 1;
and
d, e, and the other of b and c each are a number greater than 0 such that the molar ratio of b:c is in the range of from 0.5:1 to 5:1, the molar ratio of d:c is in the range of from 0.2:1 to 50:1, and the molar ratio of e:c is in the range of from 3.7:1 to 108:1;
which comprises heating a composition of the general formula

(II)

in which a is a number greater than 0 and X, M, Z, O, b, c, d and e are as defined above, at a temperature in the range of from 100 to 600° C.,
wherein the composition of general formula II is in the form of, or is recovered from, a slurry optionally after ageing at a temperature in the range of from 20 to 95° C. for a minimum of 10 minutes, said slurry being obtained by
(co)precipitating, at a temperature and for a time sufficient to produce the composition II, at least one non-noble Group VIII metal compound, at least one non-noble Group VIb metal compound, at least one refractory oxide material and an alkali compound, in a protic liquid, at least one of the metal compounds being maintained partly in solid state and partly in dissolved state.

Thus it has surprisingly been found that the method of preparing the co-precipitated catalyst compositions, has an effect on the activity. A new preparation process is provided which yields catalyst compositions of higher activity for HDS and HDN than those prepared by the method described by Landau et al. By this process it is possible to prepare crystalline and especially XRD-amorphous catalyst compositions having an especially high activity for both HDS and HDN, as well as a high mechanical strength comparable to that of commercial catalysts.

In another aspect, the present invention thus also provides a new quasi-bulk catalyst composition, prepared by either method, but preferably by the method of the invention, which exhibits a significantly improved catalytic activity compared to conventional and prior art catalysts.

Accordingly, the invention also provides a catalyst composition of the general formula I, which is prepared by a precipitation process wherein the refractory oxide material is precipitated with at least one non-noble Group VIII metal compound and at least one non-noble Group VIb metal compound, in an amount in the range of from 15 to 40 wt %, on an oxide basis.

BRIEF DESCRIPTION OF THE DRAWINGS

FIG. 1 shows the X-ray diffraction patterns of the catalyst compositions prepared in each of Examples 1 (pattern A), 3 (pattern B), and 4 (pattern C).

FIG. 2 shows the X-ray diffraction patterns of the catalyst compositions prepared in each of Examples 10 (pattern D) and 23 (pattern E).

DETAILED DESCRIPTION OF THE INVENTION

This invention relates to the hydroprocessing of chemical and petroleum feedstocks using a catalyst composition containing a high amount of Group VIII (especially Ni and/or Co) and Group VIB (especially Mo) metals and a limited amount of inert refractory oxide, e.g. silica, alumina, magnesia, titania, zirconia, boria, or zinc oxide, or mixtures thereof. We call this new catalyst type a 'bulk metal oxide catalyst'.

Herein reference is made to the Periodic Table of Elements which appears on the inside cover of the CRC Handbook of Chemistry and Physics ('The Rubber Handbook'), 66th edition and using the CAS version notation.

The term 'hydroprocessing' is used herein to cover a range of hydrotreatment processes where the hydrocarbon feed is brought in contact with hydrogen in order to modify key physical and chemical properties.

The composition I has a particularly good activity for hydrodesulfurisation (HDS) and hydrodenitrogenation (HDN). In the art of refinery processing a number of terms may be used to refer to processes which require HDS and HDN activity in some form. These terms include hydrotreating, hydrofinishing, hydrofining and hydrorefining. The compositions of and for use in the present invention therefore find use in all these hydroprocessing reactions. Useful hydrogenation activity particularly of aromatics (also known in the art as hydrodearomatisation) has also been found for these compositions.

Hydrocarbon feedstocks that contain sulfur and nitrogen include any crude or petroleum oil or fraction thereof which have a measureable sulfur and nitrogen content. The feedstocks may be previously untreated or have already undergone such treatment as fractionation, for example atmospheric or vacuum distillation, cracking for example catalytic cracking, thermal cracking, or hydrocracking, or any other hydroprocessing treatment.

Examples of suitable hydrocarbon feedstocks include catalytically cracked light and heavy gas oils, hydrotreated gas oil, light flash distillate, light cycle oil, vacuum gas oil, light gas oil, straight run gas oil, coker gas oil, synthetic gas oil, and mixtures of any two or more thereof. Other possible feedstocks include deasphalted oils, waxes obtained from a Fischer-Tropsch synthesis process, long and short residues, and syncrudes, optionally originating from tar sand, shale oils, residue upgrading processes and biomass.

The feedstock may have a nitrogen content of up to 10,000 ppmw (parts per million by weight), for example up to 2,000 ppmw, and a sulfur content of up to 6 wt %. Typically, nitrogen contents are in the range of from 5 to 5,000 ppmw, most suitably in the range of from 5 to 1500 or to 500, eg from 5 to 200, ppmw, and sulfur contents are in the range of from 0.01 to 5 wt %. The nitrogen and sulfur compounds are usually in the form of simple and complex organic nitrogen and sulfur compounds.

The catalyst compositions may be applied in any reactor type but are most suited for use in a fixed bed reactor. If necessary two or more reactors containing the catalyst may be used in series.

The catalyst compositions may be applied in single bed and stacked bed configurations, where the compositions are loaded together with layers of other treatment catalyst into one or a series of reactors in consecutive order. Such other catalyst may be for example a further hydroprocessing catalyst or a hydrocracking catalyst. Where the composition I is exposed first to the feedstock, then a second catalyst is most suitably a catalyst which is susceptible to nitrogen-poisoning.

The process of the invention may be run with the hydrogen gas flow being either co-current or counter-current to the feedstock flow.

The process of the invention is operated under the conditions of elevated temperature and pressure which are conventional for the relevant hydroprocessing reaction intended. Generally, suitable reaction temperatures lie in the range of from 200 to 500° C., preferably from 200 to 450° C., and especially from 300 to 400° C. Suitable total reactor pressures lie in the range of from 1.0 to 20 MPa.

Typical hydrogen partial pressures (at the reactor outlet) are in the range of from 1.0 to 20 MPa (10 to 200 bar), and preferably from 5.0 to 15.0 MPa (50 to 150 bar) at which pressure compositions of and for use in the present invention have been found to have a particularly improved activity compared with conventional catalysts.

The hydrogen gas flow rate in the reactor is most suitably in the range of from 10 to 2,000 Nl/kg liquid feed, for example 100 to 1000 Nl/kg, more suitably 150 to 500 Nl/kg.

A typical liquid hourly space velocity is in the range of from 0.05 to 10 kg feedstock per litre catalyst per hour (kg/l/h), suitably from 0.1 to 10, preferably to 5, more preferably from 0.5 to 5, kg/l/h.

The compositions for use in the present invention are normally sulfided before use. Such procedures are well known to the skilled person. Suitable procedures are discussed below.

Turning to the compositions of the formula I, the non-noble metal X is preferably one or two metals selected from iron, cobalt and nickel. Preferably X is selected from nickel, cobalt, and a combination of nickel and cobalt. Most preferably X represents nickel. The non-noble metal M is preferably one or two metals selected from chromium, molybdenum and tungsten. M is more preferably selected from molybdenum, tungsten and a combination of the two. Most preferably M represents molybdenum.

The element represented by Z together with a portion of the oxygen component is derived from the refractory inorganic oxide starting material. This material is no longer a separate distinct material within the composition of formula I. The element Z may be one or more elements selected from aluminium, silicon, magnesium, titanium, zirconium, boron, and zinc. Preferably Z represents one or more elements selected from aluminium, silicon and zinc. Most preferably Z represents silicon as the predominant, especially the sole, element. Additional small amounts (in the range of from 1 to 3 wt %) of zinc oxide in the refractory oxide starting material can be advantageous to increase surface area of the catalyst composition.

The numbers a, b, c, and d represent the relative molar ratio values which are given taking one component as a standard or reference. Herein one of b and c is taken as the reference and designated as the integer 1. The other values are then established as relative values, basis one of the metals X and M on an oxide basis. The number e indicates the molar ratio value for oxygen in the composition (I) which will be set by the stoichiometry of $(X)_b(M)_c(Z)_d(O)_e$.

Preferably c is the integer 1, and the ratio b:c is in the range of from 0.75:1 to 3:1, most preferably 0.8:1 to 2.5:1, especially 1:1; the ratio d:c is from 0.2, e.g. 0.3, suitably 0.5, :1 to 20:1, e.g. to 10:1, preferably 0.75:1 to 10:1, especially 0.6 to 1, e.g. 0.8:1 to 5:1; and the ratio e:c is in the range of from 4.1:1, e.g. 4.3:1, to 46:1, preferably 4.6:1 to 25.5:1, e.g. to 20:1, especially 4.8:1 to 14:1, e.g. 5:1 to 10:1.

Good results have been obtained when X is nickel; M is molybdenum; Z is silicon; O is oxygen; c is 1; b:c is in the range of from 1:1 to 2:1, especially 1:1 to 1.5:1, and is most especially 1:1; d:c is in the range of from 0.65:1 to 2:1, especially 0.75:1 to 1.2:1, and is most especially 0.9:1; and e:c is in the range of from 5.3:1 to 9.0:1, especially 5.5:1 to 6.9:1, and is most especially 5.8:1.

Depending on the method of preparation that is followed to prepare the catalyst composition for use in the invention, there could be residual ammonia, organic species and/or water species present; following different methods, different amounts as well as different types of species can be present. In respect of water, also atmospheric conditions can affect the amount present in the catalyst composition. Therefore to ensure that the catalyst composition definition is not distorted by atmospheric or preparation conditions, the definition used herein, on both an elemental basis and on percentage amount basis, is given on an oxide basis.

To establish the catalyst composition on an oxide basis, an elemental analysis is performed on a sample once all volatiles have been removed, eg by thorough heating for example at a temperature in excess of 400° C. for a minimum of 60 minutes, in accordance with standard practice in the art.

Preferably the amount of metal(s) X lies in the range of from 15 to 35 wt % as the oxide and based on total catalyst, but most preferably is in the range of from 20 to 35 wt %, and especially from 25 to 33 wt %. The metal M is suitably present in the highest amount of the two metal types; preferably the metal M is present in an amount in the range of from 40 to 75 wt % as the oxide, more preferably 45 to 60 wt %, and especially 50 to 55 wt %. The total amount of metals in the composition of formula I, as the oxide, is suitably in the range of from 50 to 95 wt %. Preferably the minimum amount of total metals is 60 wt %, more preferably 65 wt %, most preferably 70 wt % and especially 75 wt %. Preferably the maximum amount is 90 wt %, more preferably 85 wt %. The total amounts of metals is especially substantially 80 wt %.

The balance of the catalyst, on an oxide basis, is derived from a refractory oxide material, suitably in an amount in the range of from 5, preferably from 10, more preferably from 15, to 40 wt %, preferably to 35, more preferably to 30, most preferably to 25, especially to 20. Preferred compositions contain from 10 to 30 wt %, more preferably from 15 to 25 wt %, and especially contain substantially 20 wt %.

In a catalyst composition for use in the invention, when not assessed on an oxide basis, there may be in the range of from 0 to 10 wt %, basis total catalyst, of residual species, eg organics, ammonia and/or water species, and most commonly from 5 to 8 wt %. The presence and amount of such components can be determined by standard analysis techniques.

Options and other preferences for the components of the bulk metal oxide catalysts of and for use in the invention are described below with reference to the general preparation technique.

The bulk metal oxide catalyst for use in the present invention may be prepared by decomposition of a precursor of the general formula

$$(NH_4)_a(X)_b(M)_c(Z)_d(O)_e \qquad (II)$$

in which a is a number greater than 0, and X, M, Z, b, c, d and e have the meanings given above. The molar ratio of a:(b+c) is suitably from 0.1:1 to 5:1, preferably from 0.1:1 to 3:1, the molar ratio b:c is from 0.5:1 to 5:1, preferably from 0.75:1 to 3:1, especially 0.8:1 to 2.5:1. The molar ratio represented by d:c is suitably from 0.2:1 to 50:1, preferably from 0.5:1 to 20:1, more preferably 0.75:1 to 10:1, especially 0.8:1 to 5:1. The molar ratio represented by e:c is suitably from 3.7:1 to 108:1, more preferably 4.0:1 to 48:1, especially 4.5:1 to 26:1, more especially 4.6:1 to 15.5:1.

The decomposition of the precursor is performed at an elevated temperature in the range of from 100 to 600° C., preferably from 120 to 450° C., more preferably at a temperature in the range of from 250 to 350° C. The temperature most preferably is not in excess of around 350, especially 300° C., when the most active, XRD-amorphous material is wanted. The decomposition may take place in an inert atmosphere, such as under nitrogen, any noble gas or a mixture thereof, or in an oxidative atmosphere, e.g. in oxygen, oxygen-nitrogen, air, or a mixture of one or more thereof, or in a reductive atmosphere, such as hydrogen, hydrogen sulfide, or a mixture thereof. The decomposition may take place during processing of the slurry or during further processing of the composition for use, eg during extrusion or calcination before or after shaping.

The preparation process of the present invention involves contacting one or more slurries of the desired metals in a protic liquid (for example water) wherein one or more of the metal compounds, especially both, are in solid and dissolved phase simultaneously, with a refractory oxide in the presence of an alkali compound at a temperature and for a time sufficient to produce the precursor. It is possible for each metal type that the metal is provided by two metal compounds, one of which is soluble in the protic liquid and the other of which is only partly soluble. Metal in this context does not refer to the metals in metallic phase but to metallic compounds containing the necessary metal ions.

It is possible for all components to be added to the protic liquid at the same time or sequentially. Also it is possible for one or more of the metal compounds and the refractory oxide to be in slurry phase with the protic liquid, and for the remaining components to be added thereto.

The process of the invention most suitably involves the mixing of slurry phase mixtures of the Group VIb and Group VIII metal(s) compounds in water or other protic liquid blended at elevated temperature with a slurry of an alkali compound and an inert oxide (preferably silica and/or alumina) also in water or other protic liquid. While the order of addition to form slurries from the individual compounds is not critical for the formation of the catalyst composition (I), we have found that when the alkali compound is added to a slurry of partly dissolved metals and the refractory oxide, this provides the most preferred XRD-amorphous compositions of the general formula I. It is, however, possible to add the metals' slurry to the alkali compound, with the refractory oxide present in one or the other or both, and still obtain useful catalytic compositions.

Blending or mixing can be carried out for example with an Ultra Turrax machine.

During the mixing or blending process, the components of the slurries (co)precipitate to form solids of the precursor composition under the action of the alkali precipitation agent. Normally the term 'co-precipitation' is used when two or more compounds that are dissolved, precipitate out of solution together. In the process of the invention, a portion of the compounds are not dissolved and it is possible that one or more dissolved components precipitate onto the solid component(s). Therefore we prefer to use herein the terminology '(co)precipitation' when referring to precipitation of materials at least one of which is in a partly dissolved state. The process of the invention is suitably controlled through the maintenance of an appropriate temperature for an appropriate time to achieve the desired precursor. It is a routine matter to determine the appropriate temperature/time combinations for a desired end product. Suitably the temperature will lie in the range of from 25 to 95° C. and the (co)precipitation time will lie in the range of from 10 minutes to 2 hours. While essentially desired end products will arise from a control of both conditions, it is noted that operating the (co)precipitation process at higher temperatures may cause too much dissolution of the metals components to enable a good end-product; at too low a temperature then insufficient dissolution may occur.

In a preferred embodiment, an initial slurry concentration of in the range of from 2 to 40, preferably 5 to 20 wt % of nominal solids content is aimed for. By nominal solids content, the amount of solids added to the protic liquid is intended. Preferably the amount of alkali compound, eg ammonia, is at least 0.5 mol per mol of metals M+X, on an oxide basis, and at most 50 mol per mol of metals M+X, on an oxide basis. The quantity of alkaline material can affect the final form of the catalyst composition. Where the more active amorphous forms are desired, then the amount of alkaline material, eg ammonia, applied should be at least 0.75 mol, more preferably at least 0.8, especially at least 0.9 mol, per mol metals M+X, oxide basis. The amount of alkali compound utilized is preferably at most 5, more preferably at most 2, and especially at most 1.7, mol per mol metals M+X, oxide basis.

The Group VIB metal is most preferably molybdenum. Suitable Group VIII metals include cobalt, nickel or a mixture thereof. Suitable nickel compounds, which stay in partly solid phase if the solvent is water, and therefore are preferred, are nickel carbonate, nickel oxide, nickel hydroxide, nickel phosphate, nickel formiate, nickel sulfide, nickel molybdate, or a mixture of two or more thereof. Additionally soluble salts such as nickel acetate may be used in combination with one or more of these compounds. Suitable, and preferred, molybdenum compounds (based on a similar criteria) are molybdenum (di or tri) oxide, ammonium molybdate, molybdic acid, molybdenum sulfide, or mixtures thereof. These materials are commercially available or can be prepared by commonly known laboratory practices, e.g. by precipitation.

Starting materials having a C, H, and O component in addition to the desired metals are, in general, more preferred due to a lesser impact on the environment. Nickel carbonate is therefore more preferred, since it can decompose to nickel oxide, carbon dioxide and water upon heating, based on the carbonate content of the starting material.

Suitable inert materials utilised as the refractory oxide material during preparation of the precursor are those which show less catalytic activity, or no catalytic activity at all in the utilisation of hydrogen under the conditions of use, compared to the metals utilised. The BET surface area of the inert materials suitably lies in the range of from 10 to 700 $m^2/g$, more preferably from 50 to 400 $m^2/g$. These materials include silica, alumina, magnesia, titania, zirconia, boria, zinc oxide, zinc hydroxide, natural and synthetic clays and mixtures of two or more thereof. Preferred materials are silica and alumina, and mixtures thereof and/or with small amounts of zinc oxide. Where alumina is used, it is preferred to use amorphous alumina over crystalline alumina, such as $\alpha$-alumina. Most preferred, however, is silica. The form of silica utilized is not limited and any silica commonly used in catalyst carriers may be utilized in the present invention. A very suitable silica material is Sipernat 50, a white silica powder having predominantly spherical particles, available from Degussa-Sipernat is a trade name.

Suitable alkali compounds applied to prepare the slurry with the inert material are selected from hydroxides or oxohydroxides, for example, Group IA, or IB or Group IIA, or IIb hydroxides, Group IA or Group IIA silicates, Group IA, or IB or Group IIA or IIB carbonates, and equivalent ammonium compounds, or mixtures of any two or more thereof. Suitable examples include ammonium hydroxide, sodium hydroxide, ammonium silicate, ammonium carbonate, and sodium carbonate. Preferably the alkali compound is one that will generate ammonium ions in solution; this includes ammonia which, with water as the solvent, will generate the ammonium hydroxide form.

In one embodiment, a preferred starting material combination for the preparation of the bulk metal oxide precursor is nickel carbonate, molybdenum oxide and amorphous alumina. A more preferred combination is nickel carbonate, ammonium dimolybdate and silica.

It is generally preferred to utilise mixing and precipitation conditions, which keep the solvents below the boiling point temperatures of the applied solvent, i.e. below 100° C. in case of water. The pH of the slurries is generally kept at their natural pH during the entire preparation process.

The formed slurry is optionally held at ambient or elevated temperature for a period of time (commonly termed ageing) subsequent to the end of the (co)precipitation process. The ageing time usually lies in the range of from 10 minutes, suitably 30 minutes, to preferably 4 hours; the ageing temperature maybe in the range of from ambient temperature, for example, from 20, suitably from 25° C., to 95° C., preferably from 55 to 90, and especially from 60 to 80° C. The ageing period is optionally followed by cooling the obtained mixture to a lower temperature.

After optional cooling, the obtained slurry may be processed in a number of different ways in order to regain the solid content, which process can involve filtration, spray drying, flash drying, evaporation, and vacuum distillation. Certain procedures, eg evaporation, have been found to introduce crystallinity to the product. By evaporation, any process of driving off the protic liquid, e.g. water, or drying is intended, for example dessication and boil down processes. The system used will depend on a number of local factors including environmental legislations, and energy availability. Most preferred are filtration and spray drying. The former is quick and not energy intensive but requires several reiterative steps and produces higher volumes of waste water; the latter is energy intensive but generates little waste.

The preferred XRD-amorphous materials are more consistently obtained, at all refractory oxide contents, using the slurry preparation process of the invention most preferably in combination with spray drying.

The so-prepared solid product is a powder which has a loss on ignition LOI of 5 to 95% and consists preferably of primarily XRD-amorphous material, as determined by means of powder X-ray diffraction analysis; however in some embodiments crystalline material, for example ammonium NiMo oxohydroxide with layered double hydroxide structure or a Co component may be present.

Herein loss on ignition (LOI) for a material is the relative amount of lost mass upon heating the material to 540° C. following procedure: The sample is mixed well to prevent any inhomogeneity. The weighed sample is transferred into a weighed and precalcined crucible. The crucible is place to a preheated oven at 540° C. for a minimum time of 15 minutes, but typically for 1 hour. The crucible containing the dried sample is weighed again, and the LOI is determined according to the formula:

$$LOI \% = (w - w_{calc})/w * 100\%$$

where w is the original weight of the sample, $w_{calc}$ is the weight of the calcined sample after heating in the oven, both corrected with the weight of the crucible.

The prepared powder may be dried before optional further processing, especially where filtration has been used to isolate the solids. This drying or ageing can take place in any suitable atmosphere, e.g. inert, such as nitrogen, noble gases, or mixtures thereof, or oxidative gases, such as oxygen, oxygen-nitrogen mixture, air, or mixtures thereof, or a reductive atmosphere, such as hydrogen, or mixtures of reductive and inert gases or mixtures thereof, with or without ammonia and/or water moisture present. The drying temperature is preferred to lie in the range of from 20, usually 25 to 95° C., preferably 55 to 90° C. and especially from 70 to 80° C.

The powder may be used as such or, more preferably is used as a shaped catalyst formulation.

Optionally the obtained powder is calcined prior to shaping. Suitable calcination temperatures are in the range of from 100 to 600° C., preferably from 120 to 400° C. Most preferably however calcination is not performed above 350° C., especially 300° C., in order to avoid formation of any crystalline material. The calcination may also be carried out in any suitable atmosphere, e.g. inert gases as nitrogen, noble gases or a mixture thereof, or in a reactive atmosphere, e.g. oxygen, oxygen-nitrogen, air, or a mixture of one or more thereof, or a mixture of inert and reactive gases.

Prior to shaping, the obtained powder is optionally mixed with additional materials in either solid or liquid phase. Those in solid state include catalytically active materials, e.g. other catalytic materials generally used in hydrotreating applications. It is also possible to combine the obtained powder with catalytically active materials that are used in other hydroconversion processes, for example hydrocracking. Thus the powder may be combined with a cracking component, such as a zeolitic or other component that promotes hydrocracking—the conversion of a hydrocarbon feedstock to one of a lower boiling point. Such components include faujasite materials, such as zeolite Y, ZSM-5, ZSM-21, zeolite beta, or combinations thereof. Certain amorphous silica alumina materials have a cracking function and may be utilised. It is unnecessary to add to the powder any material that would act solely as a binder, but of course it is possible.

Where desired, other supplementary materials can be added. These include materials usually added during conventional catalyst preparations. Suitable examples are phosphorus materials, e.g. phosphoric acid, ammonium phosphate, or organic phosphor compounds, boron compounds, fluor containing compounds, rare earth metals, additional transition metals, or mixtures thereof. Phosphorous compounds may be added at any step of the preparation. If e.g. alumina is used as binder, phosphorous compounds can be used for peptising (with or without nitric acid).

Moreover, added materials may include additives typically referred in the art as 'shaping agents' or 'shaping aids'. Those additives may comprise stearates, surfactants, graphite, or mixtures thereof. For maximum strength in the resulting shaped materials however, particularly where shaping is by extrusion, then it is preferred to minimize the amount of any conventional extrusion aids. Most preferably, shaping is performed by extrusion in the absence of any extrusion aids.

Suitable materials in liquid phase may additionally be added to the shaping mixture obtained, which include protic, e.g. water, polyols, etc., and non-protic liquids, e.g. hydrocarbons. Protic liquids, e.g. water, may be added for example in order to bring the LOI content of the mixture to a suitable level for shaping.

In general, there is no particular order of mixing the materials (in solid and/or liquid form) together. What is important is to ensure that the sample is mixed well to prevent nonhomogenity. The amount of additional solids and liquids added during shaping lies preferentially in the range of from 0 to 95 wt % based on final weight, and depends on the requirements of the anticipated catalytic application. Shaping can be performed in various ways depending on the requirements of the application. Those methods include spray drying, extrusion, beading and/or pelletizing among others.

Sulfidation may be performed in order to turn one or more metals into its active form. If the composition is used as a shaped catalyst composition, then it may be sulfided before and/or after shaping. In general, sulfidation is carried out by contacting the catalyst or precursor with a sulfur containing material, e.g. elemental sulfur, sulfides, disulfides, etc. in gas or liquid phase. Sulfidation can be carried out at any step of the shaping procedure, including prior to the first optional drying step. It is preferred, however, that sulfidation is carried out only prior to shaping when any of the subsequent heat treatments performed are carried out under a suitable atmosphere that prevents the conversion of the (partly) sulfided phase back to an oxide state.

Preferably the sulfidation step is carried out subsequent to the shaping step(s), and, if applied, subsequent to the last calcination step. The sulfidation may be carried out ex situ (with an appropriate procedure) prior to loading the catalyst into a hydroprocessing unit. Common ex-situ procedures are the ACTICAT process (CRI International Inc.) and the SULFICAT process (Eurecat US Inc.). It is however preferred that the last sulfidation procedure is carried out in situ as follows.

The catalyst is sulfided into the active catalyst form by means of sulfidation carried out in the presence of hydrogen, by either contacting the catalyst with liquid feedstock (in liquid or partly gaseous phase), which contains and/or is enriched in sulfur, where sulfur is present in the form of an organic sulfur compound and/or elemental sulfur, or in the presence of a sulfur containing gas, or a mixture thereof.

Surface area of the final shaped product measured by the B.E.T. method, using nitrogen as adsorbate, generally lies in the range of from 10 to 350 m$^2$/g, preferably above 35 m$^2$/g, more preferably above 65 m$^2$/g. Pore volume of the final product, measured using nitrogen adsorption up to 95 nm on the B.E.T. adsorption curve, preferably lies in the range of from 0.002 to 2.0 cm$^3$/g, preferably from 0.1 to 1.0 cm$^3$/g. Flat bed crush strength, as measured by ATSM D 6175, is preferably in excess of 50 N/cm, and lies more preferably above 100 N/cm, especially above 150 N/cm. The preferred amorphous catalyst compositions of the present invention have been found to have such high crush strengths when shaped.

Catalysts which comprise a catalyst composition of the present invention exhibit a very high activity for hydrodesulphurisation and hydrodenitrification of hydrocarbon feedstocks. This activity is higher than that found for conventional NiMo and CoMo on alumina catalyst prepared by pore volume impregnation, and also higher than for bulk catalyst prepared by co-precipitation even with a minor amount of refractory oxide additionally precipitated into the catalyst.

While not wishing to be bound to any theory, it is currently thought that this exceptional activity is the result of a high dispersion factor for the metals through the oxide material, achieved through the careful control of the (co)precipitation process. The aim of the controlled (co)precipitation process is to prevent the formation of as small as possible an amount of crystalline material. High dispersion should not be confused with uniformity of dispersion; the catalyst compositions for use in and of the invention have a high activity with metals dispersed through the oxide material, but not necessarily uniformly dispersed. Despite the XRD-amorphous nature of the preferred catalyst compositions, they still exhibit high crush strength. This is in distinct contrast to the high metals-containing catalysts of EP-A-1090682 which are required to have a homogeneous or uniform metals dispersion, and a crystalline component detectable by powder X-ray diffraction analysis (XRD) for strength.

The term 'XRD-amorphous' is used herein to denote that in a diffraction pattern given by powder XRD-analysis, there is no reflection characteristic of a Group VIII or a Group VIb metal component above $2\theta=15°$ that has a characteristic full width at half maximum of 2.5° of less.

In other words the XRD-diffraction pattern shows no reflection of significant intensity that can be assigned to any of the Group VIII and Group VIb metal components.

Above $2\theta=15°$, there are broad local maxima in preferred catalyst compositions of the invention as follows:

where $2\theta$ is in the range of from 21.0°, preferably from 23.0°, to 28.0°, more preferably in the range of from 25.5° to 28.0°; alternatively, expressed in d-values, the latter range is 3.49 to 3.19;

where $2\theta$ is in the range of from 33.7° to 35.3°; alternatively, expressed in d-values, 2.67 to 2.59; and where $2\theta$ is in the range of from 59.80 to 62.20; alternatively, expressed in d-values, 1.55 to 1.49.

There is preferably no significant reflection that can be assigned to the refractory oxide component of the catalyst composition in the XRD-diffraction pattern. However, increased amount of refractory oxide material can shift the above first-mentioned characteristic local maximum to below the $2\theta=25.5°$ to 28.0° preferred range.

The preferred XRD-amorphous catalyst compositions of the present invention have, on an oxide basis, in the range of from 15 to 40 wt %, preferably to 35, or to 30 wt %, more preferably to 25 wt % refractory oxide component, and metals components selected from nickel and molybdenum, nickel and tungsten, and nickel, molybdenum and tungsten. Most preferably, silica is used as the refractory oxide component. Other metals components, such as cobalt, and some refractory oxide materials give rise to crystalline reflections and are not in this preferred group of compositions.

The most preferred catalyst compositions of the present invention thus are substantially XRD-amorphous materials, which under powder XRD analysis have no detectable crystalline component. It remains within the scope of the present invention for minor amounts of crystalline material, as detected by XRD, to be present; ideally it is present only in such an amount as to not change the activity of the amorphous material.

The novel catalyst compositions of the invention are particularly useful materials, having significantly better activity for at least HDS than conventional and prior art catalyst forms.

The present invention is also directed to their preparation by the decomposition of the precursor composition II, and to its use in the hydroprocessing of hydrocarbon feedstocks having measureable sulfur and nitrogen contamination. The preparation of the precursor of general formula II for these novel compounds may be by the procedure described in U.S. Pat. No. 6,162,350, in WO 00/41810, by Landau et al, or indeed described in EP-A-1 090 682, in which the metal compounds are either fully dissolved or partly dissolved in the liquid used, suitably a protic liquid, especially water, with the addition of the appropriate amount of refractory oxide material to one of the starting components or to a mixture of starting components. Where fully dissolved metals are utilized, it is preferred that a solution of fully dissolved metals is added to a slurry of alkali compound and refractory oxide material; this gives preferred materials over the process of addition of alkali compound to a slurry of solid refractory oxide and fully dissolved metals. Most preferably, however, the preparation is by the process of the present invention.

As above, the catalyst composition according to the present invention may be further processed as described above, eg. shaped and sulfided as necessary, and may be used in selected hydroprocessing applications to treat different streams under a wide range of conditions. These conditions comprise temperatures in the range of from 200 to 500° C., total reactor pressures in the range of from 1 to 20 MPa, liquid hourly space velocities in the range of from 0.05 to 10 Kg/l/h, and a hydrogen gas flow rate in the range of from 10 to 2,000 Nl/kg.

The following Examples illustrate the present invention.

EXAMPLES

In these Examples the following test methods have been followed to provide the measurements given Flat Plate Crush Strength: ASTM D 6175
Porosity: ASTM D 4284 with drying of the sample at 300° C. for 60 minutes prior to measurement, and using mercury intrusion.
B.E.T. Measurement: ASTM D 3663-99, as modified by ISO 9277, with drying of the sample at 300° C. for 60 minutes prior to measurement, and using nitrogen as adsorbate.
Pore volume: obtained from nitrogen adsorption up to 95 nm on the B.E.T. adsorption curve.
XRD analysis: XRD analysis was performed on a Philips PW1800 Bragg-Brentano type powder diffractometer using Cu K-α radiation between 2θ values of 5 to 60 degrees (0.05° resolution with 7 second steps). Where shaped samples were analysed, they were first crushed and pressed and placed into a sample holder (1.5 mm deep).

Examples 1 to 5, and 17 to 22 show the preparation and activity of catalyst compositions made by the metals' slurry preparation process of the invention; Examples 6 to 16 show the preparation and activity of various catalyst compositions made using fully dissolved metals' solutions; in Example 23 the activity of catalyst compositions made by both routes is compared.

Nominal composition proportions are given herein as percentages by weight.

Example 1

256.1 g ADM (ammonium dimolybdate) having 56.5 wt % Mo, 220.5 g NiCO$_3$ were mixed, and added to 2250 g water in a 5 litre Medimex autoclave, while stirring at 800 rpm. The temperature was increased to approximately 80° C., under pressure. Separately, 113 g ammonia (25 wt % strength), 1.06 mol nitrogen/mol (NiO+MoO$_3$), was diluted with 750 g water in a beaker. 92.2 g Sipernat 50 (a white silica powder with predominantly spherical particles, available from Degussa) was dispersed in this solution. The pressure of the autoclave was released, after which the autoclave was opened and the silica slurry was pumped into the metal-containing slurry. A small amount of water was used to rinse the last part of the silica into the autoclave. The autoclave was closed and the mixture was again heated under pressure to approximately 80° C. with stirring at 700 rpm for 30 minutes. The warm mixture was pumped into a flask and the solids were recovered by means of spray drying, wherein the conditions were maintained such that the solids were not exposed to a temperature above 300° C.

From XRD analysis of the non-calcined, spray dried powder the following broad local maxima were identified above 2θ=15°:
26.5°±0.5 (corresponding to d value: 3.364±0.064)
34.3°±0.2 (corresponding to d value: 2.614±0.15)
60.2°±0.2 (corresponding to d value: 1.537±0.005)
and are clearly seen in FIG. 1. Above 2θ=15° there is no reflection characteristic of Ni or Mo having a characteristic full width at half maximum (FWHM) of 2.5° or less.

All solids (both coarse and fine fractions) were collected, and extruded without the use of extrusion aids into a 1.3 mm Trilobe form (Trilobe is a registered trademark). The LOI of the extrusion mixture was adjusted to 105% of pore volume of the powder, when LOI is referred as water content only. The catalyst was calcined at 300° C. for 1 hour in air in a static furnace. The catalyst has a crush strength comparable to conventional systems. As a comparison, commercial HDS catalysts made via metals impregnation of a preformed support, commonly have a flat plate crush strength (ASTM D 6175) in the range of from 130 to 200 N/cm.

Physical properties of the final product are enlisted in Table 1.

TABLE 1

Physical properties of Example 1 product

| Method | Value |
|---|---|
| Flat Plate Crush Strength | 177.300 N/cm |
| Bulk Density (Particle Density)[1] | 1.958 g/ml |
| MPoD (area)[1] | 11.000 nm |
| MPoD (volume)[1] | 16.700 nm |
| Porosity[1] | 43.130% |
| Total pore volume (Total Intrusion)[1] | 0.220 ml/g |
| Surface area[1] | 68.351 m$^2$/g |
| Skeletal Density[1] | 3.444 g/ml |

TABLE 1-continued

Physical properties of Example 1 product

| Method | Value |
|---|---|
| Nitrogen BET Surface Area[2] | 75.000 m$^2$/g |
| Total pore volume for pores (p/p0 0.98)[2] | 0.182 ml/g |
| Nitrogen content | 0.710 % w |

[1]measured using mercury intrusion
[2]measured using nitrogen adsorption

The elemental structure of the solid in this Example is:

$(Ni)_{1.0}(Mo)_{1.0}(Si)_{0.9}(O)_{5.8}$ with a nominal catalyst composition of Ni—Mo—SiO$_2$ (27 wt %, 53 wt %, 20 wt % on oxide basis, thus referring to the nominal weight % of NiO, MoO$_3$ and SiO$_2$ in the sample).

As noted above, the XRD diffraction pattern of the spray dried composition shows the lack of any sharp reflections, which indicates that the composition is fully XRD-amorphous—see line A in FIG. 1: the presence of crystalline material would give one or more sharp reflections (which visually would look like sharp peaks), while broad reflections refer to the presence of an XRD-amorphous structure. Review of the XRD pattern for the shaped (ie extruded and calcined) catalyst composition showed this material to have a comparable XRD pattern to that of the spray dried powder

Example 2

The activity of the catalyst prepared in Example 1 for hydrodesulfurization of thiophene in gas phase and also of gas oil feedstocks were evaluated in this Example. Samples of the catalyst were crushed and sieved to 28-80 mesh fraction in order to avoid diffusion limitation during reaction. The catalyst samples were dried at 300° C. for at least 1 hour before loading 0.2 g into a glass reactor. Presulfiding is performed under atmospheric conditions in gas phase (13 vol % H$_2$S in hydrogen), with a ramp of 10° C./min from room temperature (20° C.) to 270° C., and holding for 30 minutes before raising the temperature to 350° C. again at a rate of 10° C./min. The HDS reaction of thiophene (6 vol % in hydrogen) is measured every half hour at 350° C.

Data from 1 hour and 4 hours are reported in Table 2.

TABLE 2

| Thiophene test | 60 min | 240 min |
|---|---|---|
| Thiophene conversion | 39.48% | 29.84% |
| Hydrogenation | 14.99% | 13.82% |
| Hydrog./thioph.-conv. | 0.38 | 0.46 |

Gas oil tests were performed with three feeds each having a different sulfur and nitrogen content. In these tests the activity of the catalyst prepared in Example 1 was compared against a commercial nickel-molybdenum on alumina catalyst (DN-190 from Criterion Catalysts & Technologies).

Relevant details of the feedstocks are given in Table 3. SRGO1 and SRGO2 are both straight-run gas oils which are very similar in composition. LGO is a light gas oil.

TABLE 3

Properties of feedstocks used in testing

| Details | SRGO1 | SRGO2 | LGO |
|---|---|---|---|
| Density at 20/4 (g/ml) | 0.86 | 0.86 | 0.83 |
| Nitrogen content (ppmw) | 191.00 | 165.00 | 58.20 |
| Sulfur content, XRF (wt %) | 1.61 | 1.63 | 1.01 |
| UV mono-aromatics (mmol/100 g) | 75.22 | 75.20 | 77.37 |
| UV di-aromatics (mmol/100 g) | 33.59 | 34.78 | 29.30 |
| UV poly-aromatics (mmol/100 g) | 13.02 | 17.99 | 6.96 |

Catalyst samples were loaded either crushed or in extrudate form, and were diluted with SiC. During testing, crushed materials showed comparable performance to the shaped ones in terms of reaction rates.

Sulfidation was performed in liquid phase according to standard industrial practice. The catalyst sample was sufficiently prewetted in situ and at room temperature. Subsequently, a temperature program was applied with an increase of 20° C./h, and two temperature plateaus lasting for at least 5 hours at 150 and 280° C., respectively. By doing so, the sulfidation was successfully completed within a period of 36 hours.

The conditions and results of the gas oil tests are given in Table 4.

TABLE 4

| | | Conventional catalyst | | | Bulk Metal Oxide | | |
|---|---|---|---|---|---|---|---|
| CONDITION: | | RUN A | RUN B | RUN C | RUN D | RUN E | RUN F |
| Feed stock | | SRGO1 | SRGO1 | SRGO1 | SRGO2 | SRGO2 | LGO |
| LHSV | l·l$^{-1}$·h$^{-1}$ | 1.35 | 1.89 | 1.85 | 1.50 | 1.46 | 1.53 |
| H$_2$ gas rate | Nl/kg | 207.2 | 209.7 | 213.2 | 197.80 | 202.10 | 199.30 |
| Reactor outlet pressure | bar | 39.6 | 39.6 | 49.6 | 40.0 | 60.0 | 59.9 |
| Catalyst bed temperature | ° C. | 360 | 360 | 360 | 345 | 345 | 345 |
| LIQUID PRODUCT ANALYSES: | | | | | | | |
| Sulphur content | ppmw | 370 | 247 | 181 | 220 | 18 | <2 |
| Mono-aromatics content | mmol/100 g | 92.27 | 92.35 | 92.24 | 103.78 | 79.47 | |
| Di-aromatics content | mmol/100 g | 14.15 | 14.06 | 7.88 | 7.14 | 10.57 | |
| Poly-aromatics content | mmol/100 g | 6.26 | 6.21 | 3.34 | 3.92 | 0.97 | |
| Total sulphur conversion | wt % of gross | 97.70 | 98.47 | 98.88 | 98.65 | 99.89 | >99.98 |
| Total aromatics conversion | wt % of gross | 7.51 | 7.56 | 15.08 | 8.57 | 27.54 | |

The results clearly indicate that the catalyst of the present invention exhibits at least a 15° C. advantage compared to the conventional catalysts for the treatment of similar gas oils (compare the catalyst bed temperatures). In other terms, to achieve similar catalytic activity in terms of sulfur conversion levels requires a catalyst bed temperature of 360° C. using the conventional catalyst compared to a catalyst bed temperature of 345° C. when using a bulk metal oxide catalyst of the present invention.

In some cases, especially at higher partial pressures of hydrogen, this benefit is enhanced, i.e. a lower amount of sulfur is detected in the product than when using a conventional catalyst keeping the temperature benefit constant. This benefit is clearly seen in the dramatic decrease of sulfur in product, i.e. the change from Run D to E in case of the Example 1 NiMo catalyst (sulfur in product decreased from 220 ppmw to 18 ppmw), while in case of the conventional NiMo catalyst, under similar variation in testing condition (moving from Run B to C), the change is less pronounced.

The catalyst composition of the invention also shows a good aromatics conversion, particularly at the higher hydrogen partial pressure.

Example 3

The preparation process described in Example 1 was followed, except that the applied amount of ammonia was reduced to 0.90 mol N/mol (NiO+MoO$_3$)—70 wt % of the NH$_3$ amount used in Example 1. The elemental structure is very similar to that for the material prepared in Example 1: Ni$_{0.9}$Mo$_{1.0}$SiO$_{0.9}$O$_{5.7}$. The nominal catalyst composition is the same. The XRD diffraction analysis pattern given for the spray dried powder shows no observable crystalline sharp reflections, therefore showing that the composition is clearly XRD-amorphous (see line B in FIG. 1). The following broad local maxima were identified above 2θ=15°:
26.8°±0.5 (corresponding to d value: 3.327±0.062)
34.3°±0.2 (corresponding to d value: 2.614±0.015)
60.2°±0.3 (corresponding to d value: 1.537±0.007)

Example 4

The preparation described in Example 1 was used, except that the applied amount of ammonia was reduced to 0.73 mol N/mol (NiO+MoO$_3$)—40 wt % of the NH$_3$ amount used in Example 1. The elemental structure is again very similar to that for the material prepared in Example 1: Ni$_{1.0}$Mo$_{1.0}$Si$_{0.9}$O$_{5.9}$; and the nominal catalyst composition is the same.

However, an XRD diffraction pattern of the catalyst catalyst clearly shows significant crystalline material to be present (see line C in FIG. 1).

Example 5

Catalysts prepared as in Examples 1, 3, and 4 were compared against a conventional supported NiMo catalyst (DN-200 from Criterion Catalysts & Technologies) for the conversion of a sulphur and nitrogen containing straight run gas oil at industrial gas oil hydroprocessing conditions. The catalysts were tested in extrudate form at a catalyst bed temperature of 345° C., a pressure of 60 bar of hydrogen with 200 Nl/kg flow rate for obtaining activity data on HDS, and at a pressure of 40 bar of hydrogen for HDN data. The relative volumetric activities are listed in Table 5.

TABLE 5

Effect of ammonia on the relative volumetric activities on SRGO feed

| Catalysts | Relative amount of ammonia (%) | Relative Volumetric HDS Activity (%) | Relative Volumetric HDN Activity (%) |
|---|---|---|---|
| Conventional NiMo | — | 100 | 100 |
| Example 1 | 100 | 289 | 307 |
| Example 3 | 70 | 164 | 145 |
| Example 4 | 40 | 150 | 227 |

The conventional NiMo catalyst is made by pore volume impregnation of a conventional alumina support, and shows both HDS and HDN activity. The other catalysts are bulk metal oxide catalysts of the present invention, differing in the amount of ammonia used during the preparation of the catalyst. The results indicate that the amount of alkaline (ammonia) applied during preparation affects the activity of the catalyst.

Furthermore, the results demonstrate that the catalysts of the invention clearly have an advantage in both sulfur and nitrogen removal activity compared to the conventional system.

Example 6

Catalyst having the nominal composition of Ni—Mo—O/SiO$_2$ (26%-54%-20% solids weight ratio).

In a 2 litre flask, 116 g Ni(NO$_3$)$_2$.6H$_2$O and 68.3 g ADM (technical grade, 56.5 wt % Mo) were dissolved in 800 ml water. During heating to 80° C., 17 g of HNO$_3$ (65 wt % solution) was added to obtain a clear solution having a final pH of 2.8. 24.6 g of silica (Sipernat 50) dispersed in 200 g water were subsequently added to this solution. To the resulting slurry an ammonia solution (NH$_4$OH, 7 wt %) was added slowly until a pH of 6.8 was reached. During addition of the ammonia solution precipitation occurred. The suspension was filtered and the filter cake washed with water. The filter cake was redispersed in water, filtered and washed again. The solid was dried at 80° C. for 70 minutes overnight, and subsequently shaped by means of extrusion. The extrudates were dried at 120° C. for 5 hours and calcined with a ramp of 200° C./h to 300° C., kept at 300° C. for 1 hour, and then cooled to yield the catalyst.

Elemental structure of the calcined sample:

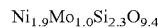

Ni$_{1.9}$Mo$_{1.0}$Si$_{2.3}$O$_{9.4}$

B.E.T. surface area of the calcined solid was 226 m$^2$/g. The total pore volume (N$_2$) measured up to 95 nm on the B.E.T. adsorption curve was 0.16 ml/g.

The composition was seen to be XRD-amorphous by XRD analysis. The following broad local maxima were identified above 2θ=15°:
27.2°±0.2 (corresponding to d value: 3.279±0.023)
34.3°±0.2 (corresponding to d value: 2.614±0.015)
60.6°±0.2 (corresponding to d value: 1.528±0.005)

Example 7

Catalyst having the nominal composition of Ni—Mo—O/SiO$_2$ (26%-54%-20% solids weight ratio).

The catalyst was prepared following the precipitation route described in Example 6. Ammonia was replaced by sodium carbonate (analytical grade). The recovered precipitate was dried and subsequently extruded. The B.E.T. surface area of the powder was 188 m$^2$/g. The pore volume of the powder, measured up to 95 nm on the B.E.T. adsorption curve, was 0.19 ml/g.

Elemental Structure: $Ni_{1.9}Mo_{1.0}Si_{1.7}O_{8.3}$

Inspection of the XRD diffraction pattern of the catalyst composition showed the catalyst to be slightly crystalline.

Example 8

Comparative

In this example, a catalyst was prepared following the procedure of WO 00/42119 Example 3 assigned to Exxon-Mobil Research and Engineering Company, US. The preparation was slightly altered with the addition of 10 wt % silica to the tungstate/molybdate solution. This was thought necessary to improve the dispersion of the solid phase after precipitation. The nominal composition of the solid is therefore 24.9 wt % $MoO_3$, 39.7 wt % $WO_3$ and 26.3 wt % NiO on oxide basis balanced with 9.1 wt % silica (also on oxide basis).

The catalyst was dried at 120° C. overnight and calcined at 300° C. for 1 hour. The apparent density of the powder after drying and calcination was 0.985 g/ml. The B.E.T. surface area of the calcined solid was 162 m$^2$/g. The pore volume—measured up to 95 nm on the B.E.T. adsorption curve—was 0.153 ml/g. Both surface area and pore volume fall within the range of preferred regions described in the WO 00/42119 patent publication.

Example 9

Full range ("virgin") straight-run gas oil, with a sulfur content of 1.45 wt % and a nitrogen content of 149 ppmw, and hydrotreated gas oil with a sulfur content of 0.092 wt % were processed over crushed catalyst samples prepared as in Examples 6, 7 and 8 in a small pilot unit. General process conditions resembled those of industrial practice—the test was performed at 60 bar hydrogen partial pressure, with 200 Nl/kg hydrogen flow rate at 345° C. over freshly sulphided catalysts.

Relative volumetric activities in HDS reaction are listed in Table 6, where the catalyst from Example 8 is taken as the reference in performance.

TABLE 6

Relative Volumetric HDS activity over virgin and hydrotreated feeds

| Catalyst (Example No.) | Relative Volumetric HDS Activity over virgin SRGO feed | Relative Volumetric HDS Activity over hydrotreated SRGO feed |
| --- | --- | --- |
| Ni—Mo—W (Ex. 8) | 100 | 100 |
| Ni—Mo/Na$_2$CO$_3$ (Ex. 7) | 131 | 45 |
| Ni—Mo/NH$_3$ (Ex. 6) | 698 | 173 |

The activity advantage of the Ni—Mo/NH$_3$ sample having the higher nominal silica content, in distillate HDS processing virgin or hydrotreated feeds, is clear. The equivalent sample prepared with sodium carbonate shows a good performance for removing sulfur from the virgin straight-run gas oil too.

Example 10

Catalyst having the nominal composition of Ni—Mo—O/SiO$_2$ (31%-59%-10%).

The preparation route described in Example 6 was adjusted so that the Ni/Mo atomic ratio remained substantially the same, while the silica content was reduced to the nominal oxide basis value of 10 wt %.

The obtained solid was dried at 120° C. overnight, and subsequently crushed and sieved into 28-80 mesh fraction. The solid was then calcined at 300° C. for 1 hour.

Elemental Structure: $Ni_{2.0}Mo_{1.0}Si_{0.9}O_{6.7}$

The XRD diffraction pattern showed that the catalyst composition has a low crystallinity (see FIG. 2).

As the same process as Example 6 was followed, it appears that direct precipitation (using fully dissolved metals) cannot provide amorphous materials for low nominal silica content catalyst compositions (of around 10 wt %).

Example 11

Catalyst having the nominal composition of Ni—Mo—O/SiO$_2$ (20%-40%-40%).

The preparation route described in Example 6 was adjusted so that the Ni/Mo atomic ratio remained substantially the same, while the silica content was increased to the nominal value of 40 wt %.

The sample was dried at 120° C. overnight. After that it was crushed and sieved into 28-80 mesh fraction, and calcined at 300° C. for 1 hour. The B.E.T. surface area after this treatment was 234 m$^2$/g. The pore volume, measured up to 95 nm on the B.E.T. adsorption curve, was 0.29 ml/g.

Elemental Structure: $Ni_{2.4}Mo_{1.0}Si_{6.3}O_{18.1}$

The composition was seen to be XRD-amorphous by XRD analysis.

The following broad local maxima were identified above $2\theta \pm 15°$:

23.5°±0.7 (corresponding to d value: 3.786±0.115)
34.3°±0.2 (corresponding to d value: 2.614±0.015)
60.5°±0.2 (corresponding to d value: 1.530±0.005)

Example 12

Full range ("virgin") straight run gas oil, and hydrotreated gas oil was processed over crushed catalyst samples of Example 6, Example 10 and Example 11 in a small pilot unit. The virgin feed contained 1.45 wt % sulfur and total nitrogen content of 149 ppmw, while the hydrotreated feed contained 0.092 wt % sulfur. The test was again performed under the typical industrial conditions of 60 bar hydrogen partial pressure, with 200 Nl/kg hydrogen flow rate at 345° C. over freshly sulfided catalysts.

Temperatures required to process to 50 ppmw sulfur in the product are calculated based on the performance, and these are compared to a leading industrial Ni—Mo catalyst over the same feeds. The required temperatures for all catalysts are listed in Table 7.

TABLE 7

Effect of nominal silica content on the relative activity

| Nominal silica content, (wt %) (Example No.) | Required temperature for 50 ppmw sulfur processing 'virgin' feed | Required temperature for 50 ppmw sulfur processing hydrotreated feed |
| --- | --- | --- |
| Ni—Mo/ref | 345 | 315 |
| 10 (Ex. 10) | 340 | 312 |
| 20 (Ex. 6) | 328 | 300 |
| 40 (Ex. 11) | 353 | 312 |

In Table 7, Ni—Mo/ref refers to a leading industrial alumina supported catalyst with Ni—Mo composition (codename DN-3110, obtainable from Criterion Catalysts & Technologies).

In Table 7, the better the performance of the catalyst, the lower the temperature that is required to achieve the same sulfur content in the product. This table clearly demonstrates that the best performance—the lowest temperature required—could be obtained with 20 wt % nominal silica content in the bulk metal oxide catalyst.

Example 13

Catalyst having the nominal composition of Ni—Mo—O/Al$_2$O$_3$ (26%-54%-20%).

The solid was prepared by following the precipitation and filtration route described in Example 6 with the modification of replacing the silica with an amorphous alumina source. After precipitation, the solids were recovered by means of filtration, and subsequently washed. The water content of the solid was adjusted by heating at 80° C. for sufficient time to obtain water content suitable for extrusion.

The solid was extruded and dried at 120° C. overnight. This treatment was followed by another calcination at 300° C. for 1 hour.

The sample showed a B.E.T. surface area of 132 m$^2$/g. The pore volume (by N$_2$), measured up to 95 nm on the B.E.T. adsorption curve was 0.23 ml/g.

Elemental Structure: Ni$_{1.2}$Mo$_{1.0}$Al$_{1.5}$O$_{6.5}$

The XRD diffraction pattern indicates a medium to low crystallinity with sharp reflections characteristic of the NiMo metals in the composition.

Example 14

Extrudate having the nominal composition of Ni—Mo—O/SiO$_2$—Al$_2$O$_3$ (26%-54%-10%-10%).

In this preparation, the preparation method of Example 6 was modified such that on weight basis an aluminum salt replaced half of the amount of silica. In order to achieve this, Al(NO$_3$)$_3$.6H$_2$O was added to the silica slurry before adding it to the metal solution. When adding the alkaline solution, a precipitation of the alumina occurred together with other compounds.

The obtained solid after filtration was dried at 120° C. overnight. The sample was crushed, and sieved into 28/80 mesh fraction, and subsequently calcined at 300° C. for 1 hour.

Elemental Structure: Ni$_{1.8}$Mo$_{1.0}$Si$_{0.8}$Al$_{0.9}$O$_{7.8}$
B.E.T. surface area: 83 m$^2$/g
Total pore volume (N$_2$): 0.12 ml/g
The composition was seen to be XRD-amorphous by XRD analysis. The following broad local maxima were identified above 2θ=15°:
18.9°±0.3 (corresponding to d value: 4.695±0.073)
22.0°±1.0 (corresponding to d value: 4.040±0.190)
35.0°±0.3 (corresponding to d value: 2.564±0.021)
61.7°±0.5 (corresponding to d value: 1.503±0.011)

Example 15

Catalyst having the nominal composition of Ni—Mo—O/SiO$_2$ (26%-54%-20%).

In a 800 ml flask, 58 g Ni(NO$_3$)$_2$.6H$_2$O and 34.15 g ADM (technical grade, 56.5 wt % Mo) were dissolved in 400 ml water together with 6 g HNO$_3$ (65 wt % solution). The temperature was raised to 80° C. under constant stirring to obtain a clear solution. 12.3 g of Sipernat 50 was dispersed in 52 g of ammonia solution (25 wt %) at room temperature. The metal solution was slowly pumped into the ammonia/silica slurry until a pH of 6.8 was reached. The precipitate was filtered, washed, redispersed, filtered and washed again. The filtercake was dried at 120° C. overnight, pressed, crushed and sieved at 28/80 mesh size. Calcination was carried out at 300° C./1h (with ramp of 200° C./hour from room temperature).

The sample had a B.E.T. surface area of 271 m$^2$/g, and a total pore volume (N$_2$) volume of 0.38 ml/g. After calcination at 300° C., the apparent density of the sample was 0.76 g/ml.

Elemental Structure: Ni$_{2.3}$Mo$_{1.0}$Si$_{4.8}$O$_{14.9}$

The composition was seen to be XRD-amorphous by XRD analysis. The following broad local maxima were identified above 2θ=15°:
23.6°±0.4 (corresponding to d value: 3.770±0.064)
34.4°±0.1 (corresponding to d value: 2.607±0.007)
60.5°±0.2 (corresponding to d value: 1.530±0.005)

Example 16

Catalyst having the composition of Ni—Mo—O/SiO$_2$ (26%-54%-20%).

46 g NiCO$_3$ and 68 g ADM (technical grade, 56.5 wt % Mo) were dissolved in 300 ml ammonia solution (25 wt % NH$_3$) at 50 to 70° C. 25 g Sipernat 50 was added to the clear solution. The excess of water was evaporated at 80 to 100° C., during which process (co)precipitation occurred. The heating was continued until all liquids were evaporated and the solids were recovered after additional drying at 120° C. The catalyst was then calcined at 300° C.

After calcination, the B.E.T. surface area of the sample was 160 m$^2$/g. The pore volume (N$_2$), measured up to 95 nm on the B.E.T. adsorption curve was 0.282 ml/g.

Elemental Structure: Ni$_{1.0}$Mo$_{1.0}$Si$_{0.9}$O$_{5.8}$

The XRD diffraction pattern of the dried material showed sharp reflections indicating that crystalline material was present, despite the calcination temperature control and ammonia concentration used, which crystallinity therefore appears to be a result of recovery of the solids by evaporation.

Example 17

Catalyst having the nominal composition of Ni—Mo—O/SiO$_2$ (26%-54%-20%).

109 g NiCO$_3$ (technical grade 39.5 wt %), 124 g ADM (technical grade 56.5 wt % Mo) and 45 g silica (Sipernat 50) was dispersed in 1485 g water at 80° C., while stirring, to form a slurry. 56 g ammonia solution (25 wt %) was mixed with the slurry, and aged for ½ hour. The slurry was spray dried following the procedure of Example 1. The obtained powder was pressed, crushed and sieved into 28/80 mesh size. Calcination was carried out at 300° C./1h (with a ramp of 200° C./hour from room temperature).

Elemental Structure: Ni$_{1.0}$Mo$_{1.0}$Si$_{1.0}$O$_{6.1}$

The composition was seen to be XRD-amorphous by XRD analysis. The following broad local maxima were identified above 2θ=15°:
26.7°±0.5 (corresponding to d value: 3.339±0.063)
34.2°±0.4 (corresponding to d value: 2.622±0.030)
60.2°±0.3 (corresponding to d value: 1.537±0.007)

Example 18

The preparation method described in Example 17 was applied with the modification of replacing ammonia with ammonium carbonate salt. In relative terms, 100% of ammonia equivalent salt was added during the reaction.
Elemental Structure: $Ni_{1.0}Mo_{1.0}Si_{0.9}O_{5.8}$ The composition was seen to be XRD-amorphous by XRD analysis. The following broad local maxima were identified above $2\theta=15°$:
26.7°±0.3 (corresponding to d value: 3.339±0.037)
34.1°±0.5 (corresponding to d value: 2.629±0.038)
60.2°±0.4 (corresponding to d value: 1.537±0.009)

Example 19

The slurry precipitation route described in Example 1 was used to prepare a solid from silica, ammonium dimolybdate, and $CoCO_3$ (technical grade 59.8 wt % CoO) with a nominal composition of 27 wt % CoO, 53 wt % $MoO_3$ and 20 wt % $SiO_2$. The B.E.T. surface area of the catalyst after extrusion was 74 m²/g. The pore volume ($N_2$) as measured up to 95 nm on the B.E.T. adsorption curve was 0.24 ml/g.
Elemental Structure: $Co_{0.9}Mo_{1.0}Si_{0.9}O_{5.8}$ The XRD diffraction pattern showed crystalline material present arising from the presence of cobalt in the catalyst.

Example 20

The slurry precipitation route described in Example 1 was used to prepare a solid from silica, ammonium dimolybdate, $NiCO_3$ (technical grade, 39.5 wt % Ni) and $CoCO_3$ (technical grade 59.8 wt % CoO) with a nominal composition of 13.5 wt % NiO, 13.5 wt % CoO, 53 wt % $MoO_3$ and 20 wt % $SiO_2$. The B.E.T. surface area of the catalyst after extrusion was 77 m²/g. The pore volume (N2) as measured up to 95 nm on the B.E.T. adsorption curve was 0.23 ml/g.
Elemental Structure: $Ni_{0.5}Co_{0.5}Mo_{1.0}Si_{0.9}O_{5.7}$ The XRD diffraction pattern showed crystalline material present arising from the presence of cobalt in the catalyst.

Example 21

Full range straight-run gas oil with both sulfur and nitrogen impurities was processed in a microflow unit over conventional CoMo and NiMo based catalysts (DC-130 and DN-200 from Criterion Catalysts & Technologies), and over bulk metal oxide type catalysts of the present invention. Test conditions were chosen to represent industrially relevant hydrotreating reactors, and were conducted at 345° C., 60 bar hydrogen partial pressure for HDS and 40 bar for HDN measurements, and a gas to oil ratio set to 200 Nl/kg.

In Table 8 relative volumetric activities of catalysts prepared by following the methods of Example 1 and Example 19 are compared to conventional HDS/HDN catalysts.

TABLE 8

Relative volume activities in HDS and HDN with varying composition of bulk system vs. conventional catalysts

| Catalysts (Example No.) | Relative Volume Activity in HDS (%) | Relative Volume Activity in HDN (%) |
|---|---|---|
| NiMo—$Al_2O_3$ | 100 | 100 |
| NiMo Bulk (Ex. 1) | 289 | 307 |
| CoMo Bulk (Ex. 19) | 164 | 111 |
| CoMo—$Al_2O_3$ | 100 | 100 |
| CoMo Bulk (Ex. 19) | 228 | 238 |
| NiMo Bulk (Ex. 1) | 402 | 656 |

The NiMo—$Al_2O_3$ and CoMo—$Al_2O_3$ samples are conventional HDS/HDN catalysts supported on alumina carriers and prepared by pore volume impregnation. The catalysts of this invention are illustrated by the samples NiMo Bulk, and CoMo Bulk. The data clearly show the advantage of the bulk metal oxide catalysts in HDS and HDN activity over a conventional CoMo—$Al_2O_3$ catalyst as well as over a conventional NiMo—$Al_2O_3$ catalyst.

Example 22

The slurry precipitation route described in Example 1 was used to prepare a solid having a nickel to molybdenum molar ratio of 1:1, and a molybdenum to zinc molar ratio of 10:1. The catalyst was prepared from silica, ammonium dimolybdate, $NiCO_3$ (technical grade, 39.5 wt % Ni) and a zinc salt with a composition of $2ZnCO_3\cdot 3Zn(OH)_2\cdot xH_2O$ (with a ZnO content of 72 wt %). The preparation aimed at a composition of 20 wt % $SiO_2$, 51 wt % $MoO_3$, 3 wt % ZnO and 26 wt % NiO.
Elemental Structure: $Ni_{1.0}Mo_{1.0}Si_{0.9}Zn_{0.1}O_{5.9}$ The B.E.T. surface area of the catalyst after extrusion was 121 m²/g. The pore volume ($N_2$) as measured up to 95 nm on the B.E.T. adsorption curve was 0.22 ml/g. This Example demonstrates the advantage of using the Zn salt for boosting the surface area of the final extrudate. The XRD diffraction pattern indicates a small amounts of crystalline material to be present.

Example 23

A catalyst composition corresponding to that of Example 10 having a 10 wt % nominal silica content was made by following the procedure described in Example 17. The obtained solid after the slurry preparation and powder recovery was extruded and calcined at 300° C. After cooling down, the extrudates were crushed, sieved at 28/80 mesh size.

Full range ("virgin") straight run gas oil was processed over crushed catalyst samples of Example 10 (prepared using fully dissolved metals' solutions) and the present Example in a small pilot unit. The virgin feed contained 1.63 wt % sulfur and 165 ppmw nitrogen. The test was performed under the typical industrial conditions of 60 bar hydrogen partial pressure, with 300 Nl/kg hydrogen flow rate at 345° C. over freshly sulfided catalysts.

A direct comparison is made on the basis of the pseudo first order reaction rate constants (k) and the obtained sulfur in the product under test conditions. The relative volume activity (RVA) is calculated from the pseudo first order rate constants directly, and are normalized on the performance of the sample from Example 10 to serve as an illustration for the differences in activity. The rate constants, sulfur slip and the normalized relative volume activities are listed in Table 9.

TABLE 9

Benefit of slurry preparation

| | Example 23 | Example 10 |
|---|---|---|
| $k\ (l\cdot l^{-1}\cdot h^{-1})$ | 82.5 | 54.4 |
| S in product (ppmw) | 17 | 38 |
| RVA (%) | 152 | 100 |

From Table 9, it can be seen that both catalysts reduce the level of sulfur considerably; however the activity advantage of the slurry preparation catalyst is clear. The pseudo first order rate constant of the slurry prepared sample under identical testing conditions is significantly higher, resulting in a much lower sulfur level in the product recovered after reaction. The relative volume activity of this sample is approximately 50% higher.

From FIG. 2, the XRD-amorphous nature of the spray dried composition of Example 23 is clear; the composition of Example 10 clearly contains crystalline components.

The XRD-analysis of the spray dried powder of Example 23 gave the following broad local maxima above 2θ=15°:
27.2°±0.5 (corresponding to d value: 3.279±0.060)
34.2°±0.4 (corresponding to d value: 2.622±0.030)
60.3°±0.4 (corresponding to d value: 1.535±0.009)

The XRD-analysis of the shaped catalyst of Example 23 showed a comparable XRD pattern.

We claim:

1. A process for the preparation of a catalyst composition having the general formula, on an oxide basis, $$(X)_b(M)_c(Z)_d(O)_e \quad (I)$$

wherein
X represents at least one non-noble Group VIII metal;
M represents at least one Group VIB metal;
Z represents one or more elements selected from the group consisting of aluminum, silicon, magnesium, titanium, zirconium, boron and zinc;
O represents oxygen;
one of b and c is the integer 1; and
d, e, and the other of b and c each are a number greater than 0 such that the molar ratio of b:c is in the range of from 0.5:1 to 5:1, the molar ratio of d:c is in the range of from 0.1:1 to 50:1, and the molar ratio of e:c is in the range of from 3.6:1 to 108:1;
said process comprises heating a composition of the general formula $$(NH_4)_a(X)_b(M)_c(Z)_d(O)_e \quad (II)$$

in which a is a number greater than 0 and X, M, Z, O, b, c, d and e are as defined above, at a temperature in the range of from 100 to 600° C.,
wherein the composition of general formula II is in the form of, or is recovered from, a slurry optionally after ageing at a temperature in the range of from 20 to 95° C. for a minimum of 10 minutes, said slurry being obtained by coprecipitating, at a temperature and for a time sufficient to produce the composition II, at least one non-noble Group VIII metal compound, at least one Group VIB metal compound, at least one refractory oxide material and an alkali compound, in a protic liquid, at least one of the metal compounds being partly in solid state and partly in dissolved state.

2. A process as claimed in claim 1, wherein said heating of the composition II is at a temperature not exceeding 350° C.

3. A process as claimed in claim 2, wherein the coprecipitation is carried out at a temperature in the range of from 25 to 95° C., for a period of time in the range of from 10 minutes to 2 hours, at an alkali concentration of from 0.2 mol per mol of metals M+X, on an oxide basis, to 50 mol per mol of metals M+X, on an oxide basis, and with an initial slurry concentration in the range of from 2 to 40 wt % nominal solids content.

4. A process as claimed in claim 3, wherein the alkali compound is ammonia or a material that will generate ammonium ions in the protic liquid used.

5. A process as claimed in claim 4, wherein the alkali concentration is in the range of from 0.75 to 5 mol nitrogen per mol of metals M+X, on an oxide basis.

6. A process as claimed in claim 5, wherein the composition of the general formula I is further subjected to any one or more of the following process steps carried out in any appropriate order: cooling; optionally isolating; drying; shaping, preferably by extrusion using no extrusion aids; calcining; sulfiding.

7. A process for the preparation of a catalyst composition, said process comprises heating a composition having the general formula $$(NH_4)_a(X)_b(M)_c(Z)_d(O)_e \quad (II)$$

in which a is a number greater than 0 and X, M, Z, O, b, c, d and e are as defined in claim 1, at a temperature in the range of from 100 to 600° C. to yield said composition having the general formula, on an oxide basis, $$(X)_b(M)_c(Z)_d(O)_e \quad (I)$$

wherein
X represents at least one non-noble Group VIII metal;
M represents at least one Group VIB metal;
Z represents one or more elements selected from the group consisting of aluminum, silicon, magnesium, titanium, zirconium, boron and zinc;
O represents oxygen;
one of b and c is the integer 1; and
d, e, and the other of b and c each are a number greater than 0 such that the molar ratio of b:c is in the range of from 0.5:1 to 5:1, the molar ratio of d:c is in the range of from 0.1:1 to 50:1, and the molar ratio of e:c is in the range of from 3.6:1 to 108:1.

8. A bulk metal oxide catalyst composition prepared by a process as claimed in any one of claims 1 to 6.

* * * * *